US008941595B2

(12) United States Patent
Dews

(10) Patent No.: US 8,941,595 B2
(45) Date of Patent: Jan. 27, 2015

(54) ALTERNATING, COMPLEMENTARY CONDUCTIVE ELEMENT PATTERN FOR MULTI-TOUCH SENSOR

(75) Inventor: Christopher William Dews, Fremont, CA (US)

(73) Assignee: Integrated Device Technology, Inc., San Jose, CA (US)

( * ) Notice: Subject to any disclaimer, the term of this patent is extended or adjusted under 35 U.S.C. 154(b) by 794 days.

(21) Appl. No.: 12/543,277

(22) Filed: Aug. 18, 2009

(65) Prior Publication Data

US 2010/0079393 A1    Apr. 1, 2010

Related U.S. Application Data

(60) Provisional application No. 61/101,974, filed on Oct. 1, 2008.

(51) Int. Cl.
  *G06F 3/041* (2006.01)
  *G06F 3/044* (2006.01)

(52) U.S. Cl.
  CPC ..................................... *G06F 3/044* (2013.01)
  USPC ....................................................... 345/173

(58) Field of Classification Search
  CPC ..................................................... G06F 3/044
  USPC ............. 345/156–184, 104; 178/18.01–20.04
  See application file for complete search history.

(56) References Cited

U.S. PATENT DOCUMENTS 5,459,463 A * 10/1995 Gruaz et al. ................... 341/33
5,488,204 A * 1/1996 Mead et al. ............... 178/18.06
6,028,594 A * 2/2000 Inoue ........................... 345/173
7,973,771 B2 * 7/2011 Geaghan ...................... 345/173
2004/0252109 A1 * 12/2004 Trent et al. ................... 345/174
2005/0184965 A1   8/2005 Geaghan et al.
2006/0097991 A1 * 5/2006 Hotelling et al. ............. 345/173

(Continued)

FOREIGN PATENT DOCUMENTS

CN    1834881 A    9/2006
CN   101551726 A   10/2009

OTHER PUBLICATIONS

PCT International Search Report and the Written Opinion mailed Nov. 18, 2009, in related International Application No. PCT/US2009/059045.

(Continued)

*Primary Examiner* — Patrick F Marinelli
(74) *Attorney, Agent, or Firm* — Hayes and Boone LLP

(57) ABSTRACT

A touch sensor includes conductive elements of substantially concave shape to enable detection of multiple simultaneous touches in at least two directions, with reduced noise sensitivity and enhanced accuracy. The shapes of the conductive elements may be similar, or may be alternating, complementary shapes that cover substantially all of the sensor area. The conductive elements physically interact with adjacent elements in such a way that the area covered by a touch changes monotonically from overlapping substantially all of one element to overlapping substantially all of an adjacent element as the touch area is moved from one element to the other element along a line between the centers of those adjacent elements. Such monotonic change of touch overlap area may occur simultaneously in two orthogonal directions. Connections from internally positioned conductive elements to a touch controller may be made to pass through other conductive elements.

6 Claims, 13 Drawing Sheets

(56) References Cited

U.S. PATENT DOCUMENTS

| | | |
|---|---|---|
| 2006/0114247 A1 | 6/2006 | Brown |
| 2007/0008299 A1* | 1/2007 | Hristov .......................... 345/173 |
| 2007/0279395 A1* | 12/2007 | Philipp et al. ................. 345/173 |
| 2008/0006453 A1 | 1/2008 | Hotelling |
| 2008/0041640 A1 | 2/2008 | Gillespie et al. |
| 2008/0062139 A1* | 3/2008 | Hotelling et al. ............. 345/173 |
| 2008/0150906 A1 | 6/2008 | Grivna |
| 2008/0246496 A1* | 10/2008 | Hristov et al. ................. 324/686 |
| 2009/0002337 A1* | 1/2009 | Chang ........................... 345/174 |
| 2010/0289774 A1* | 11/2010 | Pan et al. ...................... 345/175 |
| 2011/0273391 A1* | 11/2011 | Bae ............................... 345/173 |

OTHER PUBLICATIONS

PCT International Search Report and the Written Opinion mailed Nov. 18, 2009, in related International Application No. PCT/US2009/059045, 8 pages.

First Office Action mailed Mar. 26, 2013, in related Chinese Application No. 200980148056.9.

\* cited by examiner

ALTERNATING, COMPLEMENTARY CONDUCTIVE ELEMENT PATTERN FOR MULTI-TOUCH SENSOR

CROSS-REFERENCE TO RELATED APPLICATIONS

This application relates to and claims priority to U.S. Provisional Patent Application No. 61/101,974 filed Oct. 1, 2008, the disclosure of which is incorporated herein by reference, as if fully stated here, for all purposes.

BACKGROUND

1. Field of the Invention

The present invention relates to a touch sensor and, more specifically, to conductive element patterns on a touch sensor and methods of determining touch locations with such conductive element patterns.

2. Description of the Related Arts

Modern electronic devices often have touch sensors to receive input data. There are a variety of types of touch sensor applications, such as touch sensors, digitizers, touch buttons, touch switches, touch scroll bars, and the like. Touch sensors have a variety of types, such as resistive type, capacitive type, and electro-magnetic type. A capacitive touch sensor is coated with a conductive material, typically Indium Tin Oxide (ITO) or copper, which conducts continuous electrical current across a sensor. The sensor exhibits a precisely controlled field of stored charge in both the horizontal and vertical axes of a display to achieve capacitance. The human body is also an electrical device which has stored charge and therefore also exhibits capacitance. When the sensor's normal capacitance field (its reference state) is altered by another capacitance field, e.g., by the touch with someone's finger, capacitive type touch sensors measure the resultant distortion in the characteristics of the reference field and send the information about the touch event to the touch sensor controller for mathematical processing. There are a variety of types of capacitive touch sensor controllers, including Sigma-Delta modulators (also known as capacitance-to-digital converters—CDCs-), charge transfer type capacitive touch sensor controllers, and relaxation oscillator type capacitive touch sensor controllers.

Conventional touch sensors typically require multiple layers of ITO to detect multiple touches on the touch sensor. Some conventional touch sensors may use a single ITO layer, but they are not capable of determining the location of multiple simultaneous touches in more than a single direction due to the way the single ITO layer is disposed on the touch sensor.

Therefore, there is a need for touch sensors that more accurately determine the position of touches on a touch-sensitive sensor Likewise, there is a need for touch sensor controllers that are capable of determining the position of a plurality of simultaneous touches along the two dimensions of a touch-sensitive sensor.

SUMMARY OF THE INVENTION

A touch sensor and a method for determining touch locations on a sensor, are provided. The touch sensor comprises alternating, single-layer conductive elements of complementary, substantially concave shapes, arranged to substantially fill an area of the sensor, and so that a single touch interacts simultaneously with multiple conductive elements in every location of the sensor. A touch sensor controller is also provided that includes a processor circuit and a memory circuit to perform calculations to accurately determine touch locations and store those locations in memory for further processing. The touch controller is coupled to each of the conductive elements with connectors comprising conductive components.

A method of determining touch locations on a touch sensor according to some embodiments of the present invention includes using the touch controller to measure changes in the capacitance of each of the conductive elements resulting from contact with the sensor by a user. Then a group of adjacent conductive elements is selected, based on the measurements of the touch controller. With the coordinates of the centers of each of the conductive elements, stored in the memory of the touch controller, a weighted average of said coordinates is evaluated. A touch position is then assigned based on the evaluated weighted average of the selected group of adjacent conductive elements.

These and other embodiments of the present invention are further described below with reference to the following figures.

BRIEF DESCRIPTION OF THE DRAWINGS

The teachings of the embodiments of the present invention can be readily understood by considering the following detailed description in conjunction with the accompanying drawings.

DETAILED DESCRIPTION OF EMBODIMENTS

The Figures and the following description relate to some embodiments of the present invention by way of illustration only. It should be noted that from the following discussion, alternative embodiments of the structures and methods disclosed herein will be readily recognized as viable alternatives that may be employed without departing from the principles of the present invention.

Reference will now be made in detail to several embodiments of the present invention(s), examples of which are illustrated in the accompanying figures. It is noted that wherever practicable similar or like reference numbers may be used in the figures and may indicate similar or like functionality. The figures depict embodiments of the present invention for purposes of illustration only. One skilled in the art will readily recognize from the following description that alternative embodiments of the structures and methods illustrated herein may be employed without departing from the principles of the invention described herein.

According to some embodiments of the present invention, a touch sensor includes single-layer conductive elements of complementary shape to enable detection of multiple simultaneous touches in at least two directions. The shapes of the conductive elements may be any group of substantially concave polygons, forming a tiling or 'tessellation' of the plane when fitted together. In some embodiments of the present invention, the shapes are selected such that the touch-sensor is covered, leaving no significant gaps, and further such that any given touch area interacts with multiple elements in every location of the touch sensor. Some embodiments may consist of conductive elements with identical, substantially concave shapes, rather than alternating, complementary shapes. The, complementary conductive elements physically interact with adjacent elements, in such a way that the area covered by a touch changes monotonically from overlapping substantially all of one element to overlapping substantially all of an adjacent element as the touch area is moved from one element to the adjacent element along a line between the centers of those adjacent elements. Such change of touch overlap area may occur simultaneously in two orthogonal directions. Connections from internally positioned conductive elements to a touch controller may be made to pass through other conductive elements. The conductive element pattern may exhibit symmetry in two orthogonal directions, in that, if a pattern is made up of whole elements (without partial, cropped elements), the pattern may be rotated through a 90° angle without changing the pattern features. In some embodiments, the pattern of conductive elements can be rotated through any angle with the operation or properties of the resulting touch sensor remaining substantially the same.

Figure 1:
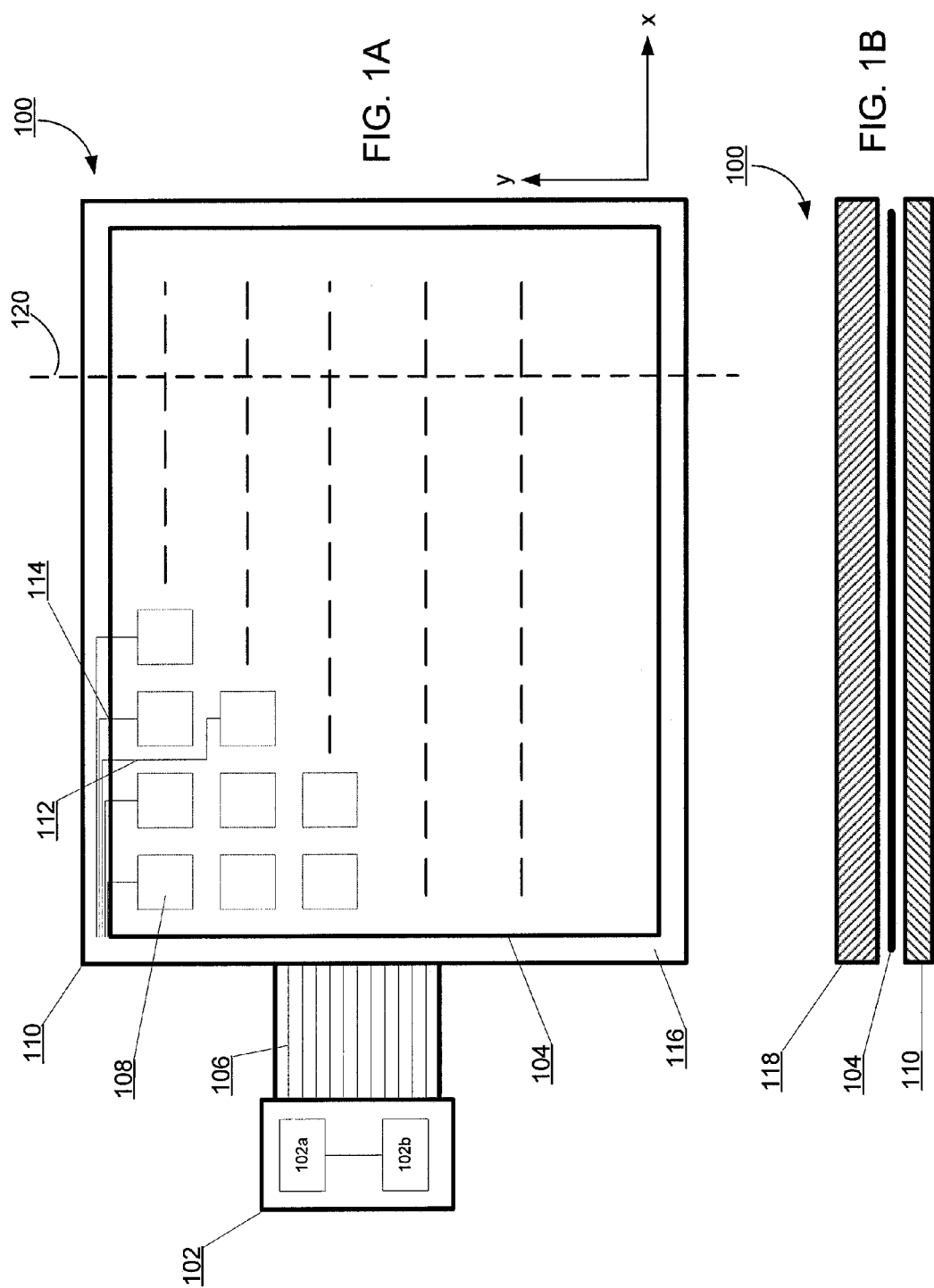
FIG. 1A illustrates a plan view of a touch sensor layout.
FIG. 1B is a cross-sectional view of the touch sensor across line 120 of FIG. 1A.

FIG. 1A illustrates a plan view of a touch sensor layout, and FIG. 1B is a cross-sectional view of the touch sensor across line 120 of FIG. 1A. Touch sensor 100 is a capacitive touch sensor, and is connected to touch sensor controller 102 via interconnect (cable) 106. Touch sensor controller 102 performs a variety of functions to detect the touches and determine the locations of the touches on the touch sensor 100, as explained below. To perform these functions, controller 102 is provided with a processor 102a, and a memory 102b.

As shown in FIG. 1B, touch sensor 100 includes a transparent substrate or base (glass or plastic) 110, a plurality of conductive touch sensor elements (or conductive elements) 108 typically made of ITO (Indium Tin Oxide) material or other transparent conductive material disposed on base 110, and a transparent hard coat overlay 118 covering the conductive elements 108. The area on which conductive elements 108 are disposed form touch sensor active area 104. Each of the conductive elements 108 are electrically coupled to cable 106, and eventually to controller 102, via electrical connections or traces 114. The area of touch sensor 100 outside the touch sensor active area 104 forms touch sensor border 116. For purposes of illustration herein, the 'x' and 'y' directions of touch sensor 100 are shown in FIG. 1A.

The array of conductive elements 108 are used to enable controller 102 to detect a change in capacitance between each conductive element 108 and the environment in response to a touch on affected conductive elements 108. In general, a touch over conductive element 108 increases the capacitance between conductive element 108 and the environment proportional to the area of conductive element 108 affected by the touch. The number of touches and their touch locations can be determined by comparing the change in capacitance associated with each conductive element 108.

A difficulty that arises with touch sensors using a single conductive layer is connecting to inner conductive elements that are not on the periphery of touch sensor active area 104. Typically, on a single layer touch sensor pattern, connections 112 pass between conductive elements 108 to connect to controller 102, as shown in FIG. 1A. However, this method of routing inner element connections may cause significant error in touch position determination. These errors also enlarge the dimensions of the touch sensor, and it can be difficult to compensate for them.

Figure 2:
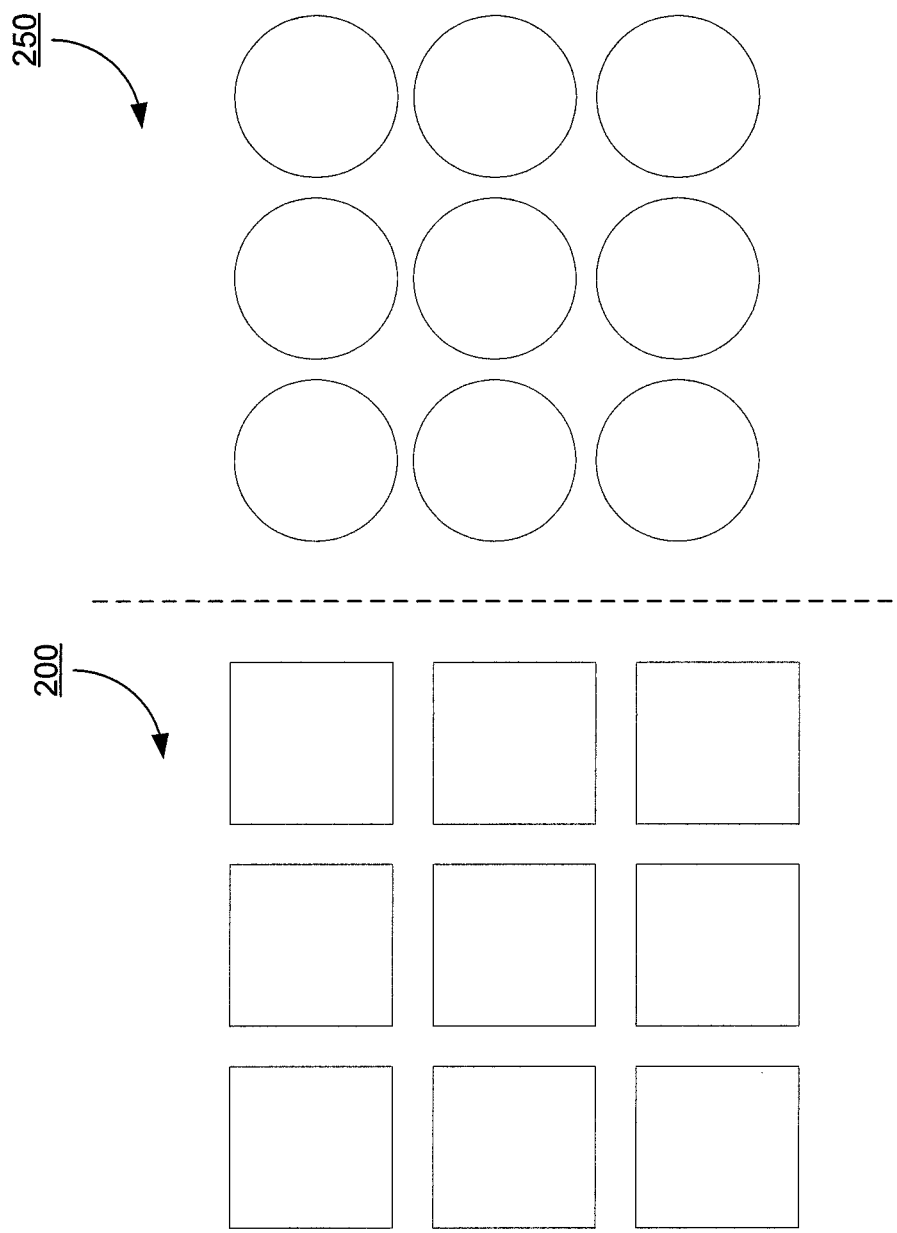
FIG. 2 illustrates a conventional layout of conductive elements for conventional touch sensors.

FIG. 2 illustrates a conventional layout of conductive elements for conventional touch sensors. The conventional layout of FIG. 2 includes an array of square 200 or circle 250 shaped conductive elements. However, the conventional layout of FIG. 2 cannot accurately detect and determine the locations of multiple simultaneous touches on the touch sensor.

Figure 3:
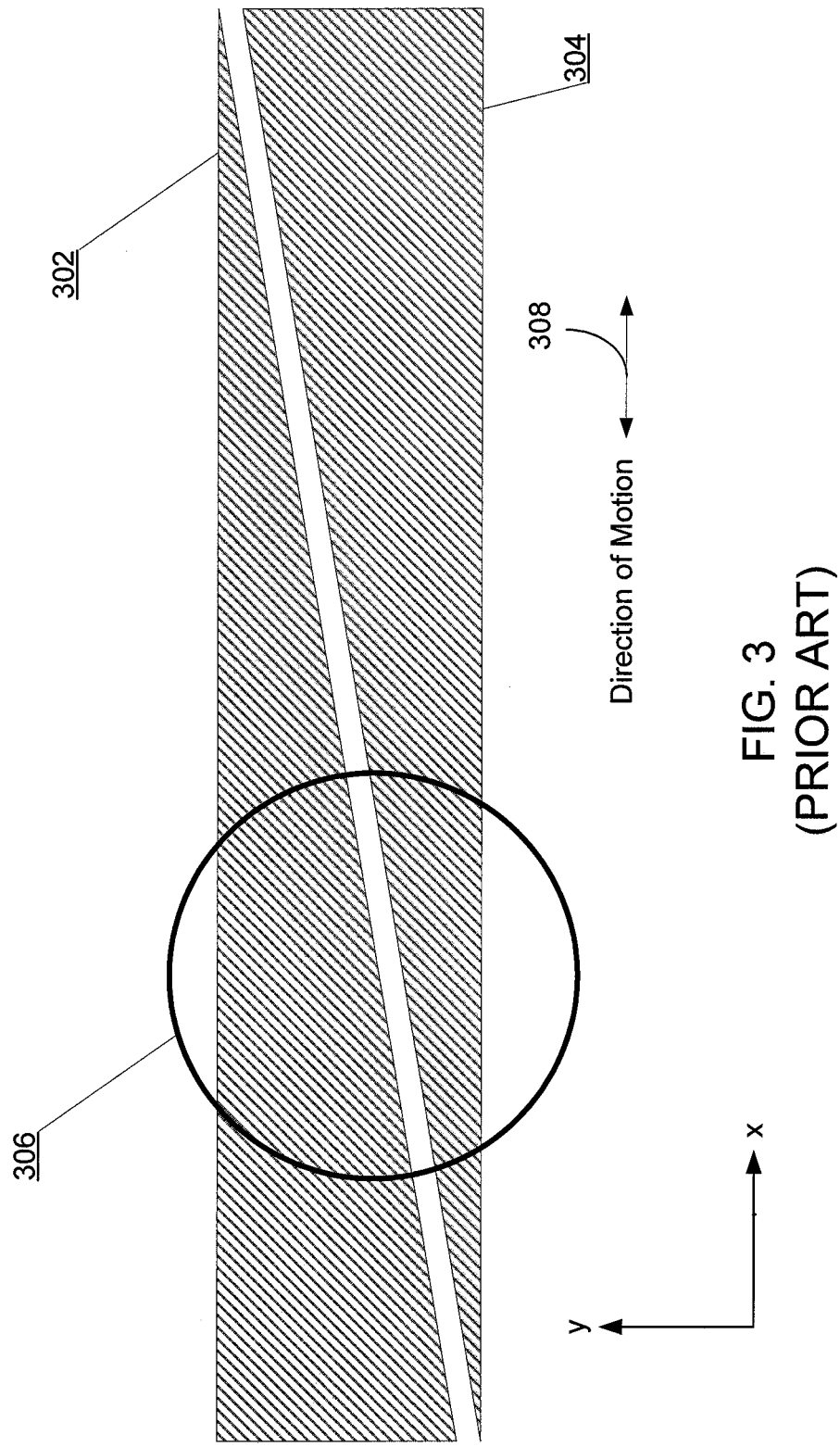
FIG. 3 illustrates another conventional layout of conductive elements for conventional touch sensors.

FIG. 3 illustrates another conventional layout of conductive elements for conventional touch sensors. Two tapered-shaped conductive elements 302, 304 touch elements are used. The conductive element pattern of FIG. 3 allows for one-dimensional linear change of touch area 306 (for example, by a single finger) as the touch position changes along the direction of motion 308 and detection of multiple simultaneous touches only orthogonal to the 'x' direction, that is, along the 'y' direction of FIG. 3. Thus, the conductive element of FIG. 3 does not allow for detection of multiple simultaneous touches in two-dimensions.

Figure 4:
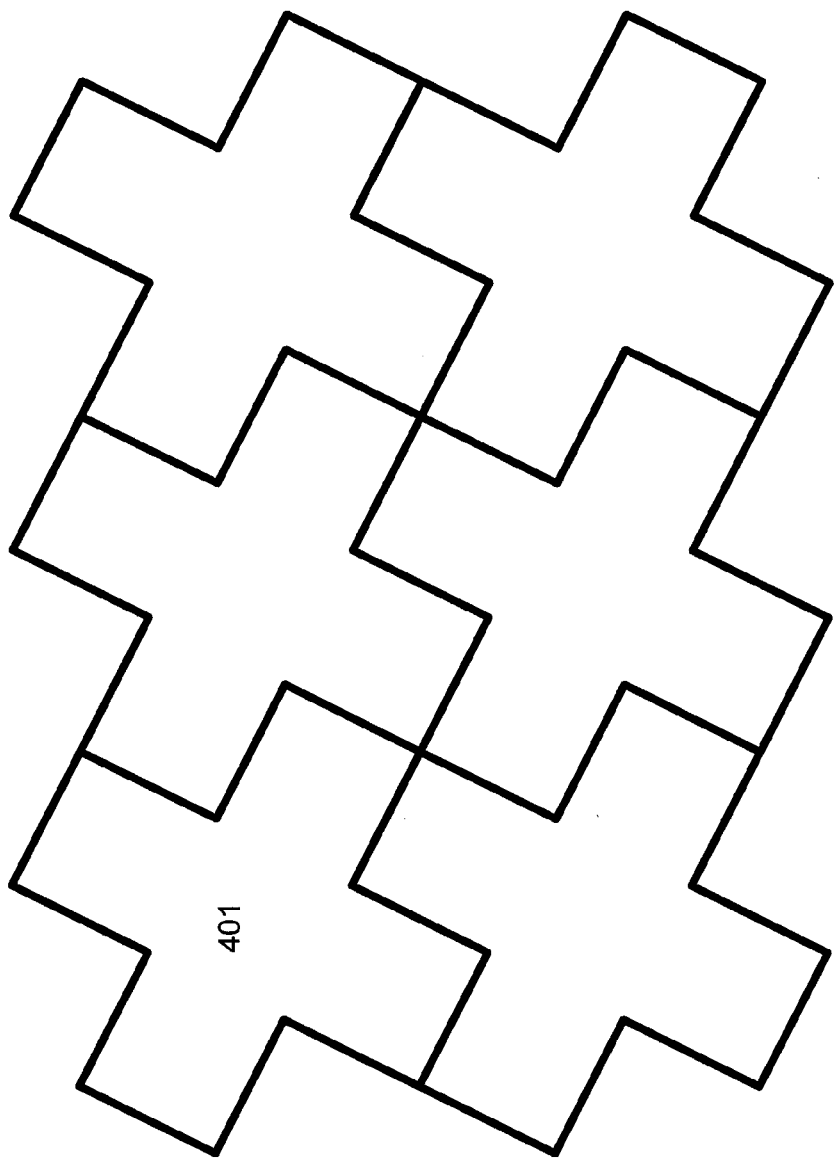
FIG. 4 illustrates a layout of conductive elements for touch sensors, according to some embodiments of the present invention, using identical shapes.

FIG. 4 illustrates an exemplary embodiment according to the present invention, wherein the tessellation or tiling of the touch sensor area is performed utilizing the same substantially concave shape, 401, repeated many times across the sensor area. In this particular embodiment, the shape is composed of interlocking quadrilateral figures, arranged in a cross pattern.

Figure 5:
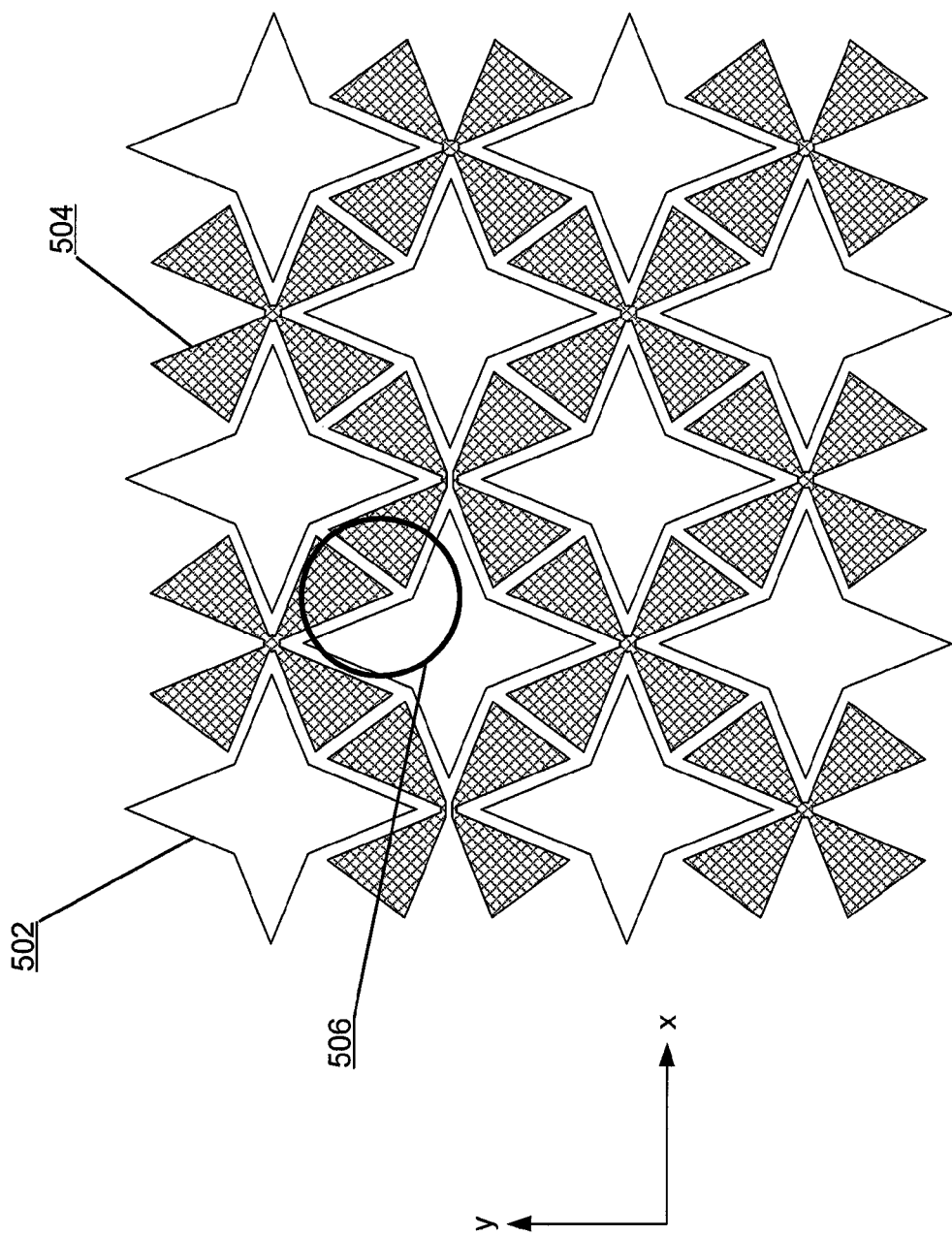
FIG. 5 illustrates a layout of conductive elements for touch sensors, according to some embodiments of the present invention using alternating, complementary shapes.

FIG. 5 illustrates a layout of conductive elements for touch sensors which may be utilized in a touch sensor such as that shown in FIGS. 1A and 1B according to some embodiments of the present invention. The layout includes star-shaped conductive elements 502 and cross-shaped conductive elements 504, disposed in an alternating manner such that each star-shaped element 502 is surrounded on its four sides by cross-shaped elements 504 and each cross-shaped element 504 is surrounded on its four sides by star-shaped elements 502. The star-shaped elements 502 and cross-shaped elements 502 are complementary shapes such that they snug and fit closely like a mesh when placed adjacent to each other, with little uncovered space in between elements 502 and elements 504. In other words, elements 502 and 504 are positioned and shaped in a fashion so as to substantially fill the entire area of the touch-sensor, with minimal residual portions left uncovered. The shapes of the conductive elements may be any group of substantially concave polygons, forming a tiling or 'tessellation' of the plane. A substantially concave polygon is defined herein as a polygonal shape that is not convex, wherein a convex polygon is such polygonal shape that for any two points in the interior of said polygonal shape, all the points comprising the straight line segment joining the two points are also in the interior of the polygonal shape.

As will be explained below in more detail, the alternating, complementary star conductive elements 502 and cross conductive elements 504 used in some embodiments of the present invention, may provide a linear change in the affected area of touch 506 with a change of position of touch 506 in two orthogonal dimensions, 'x' and 'y,' using only a single conductive layer. Star elements 502 and cross elements 504 can be made of any conductive material, typically copper or ITO, in a single layer. Also, star elements 502 and cross elements 504 may be of approximately the same area, thereby simplifying the calculation of the touch position, as will be explained below in more detail with reference to FIG. 9.

Note that the total area touched in touch 506, also called the 'touch weight,' may differ markedly between different fingers, different people and even for the same person at different times or in different circumstances. A universal definition of touch weight may be used in some embodiments of single/dual touch determination, but it may not be preferred in cases where multiple touches need to be determined.

Figure 6:
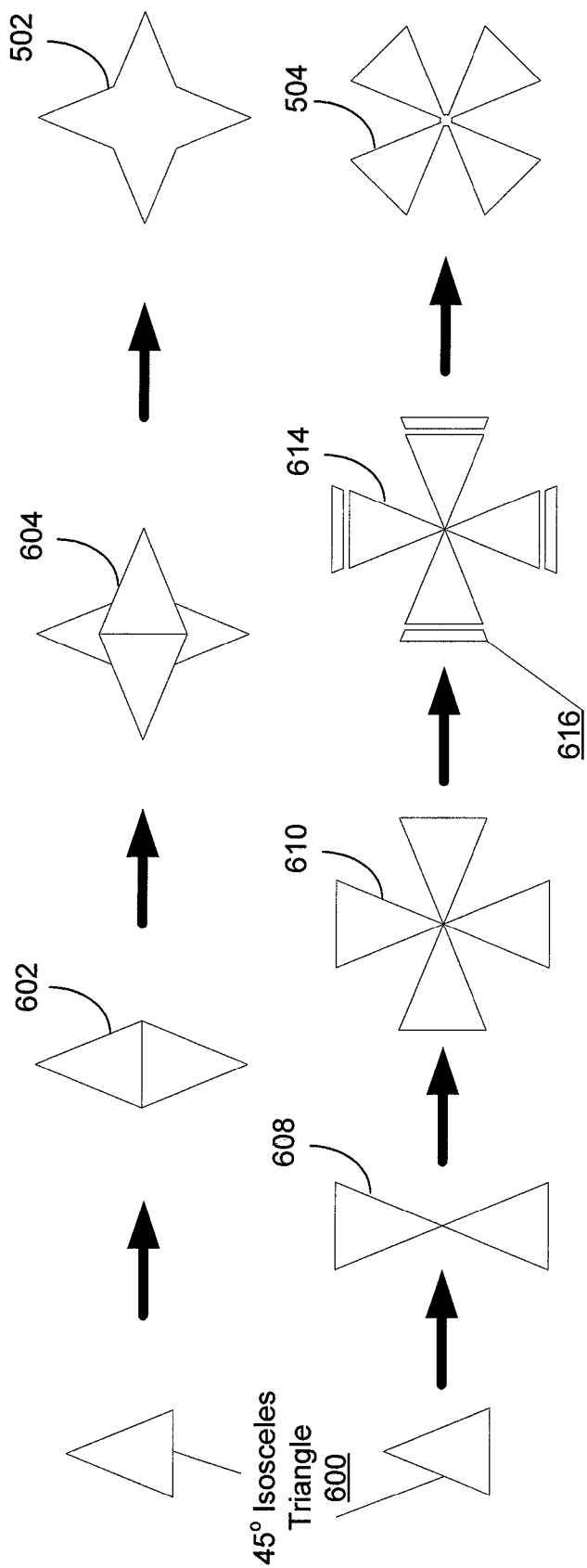
FIG. 6 illustrates how the shapes of the conductive elements of FIG. 5 are derived, according to some embodiments of the present invention.

FIG. 6 illustrates how the shapes of the conductive elements of FIG. 5 are derived, according to some embodiments of the present invention. Both star elements 502 and cross elements 504 may be derived from 45 degree isosceles triangles 600. As shown in FIG. 6, two 45 degree isosceles triangles 600 are combined to form a diamond shape 602, and two diamond shape elements 602 are combined 604 in orthogonal directions to obtain shape 502, which is star-shaped, and corresponds to conductive element 502. Similarly, two 45 degree isosceles triangles 600 may be combined to form shape 608, and two shapes 608 may be combined to form shape 610 in orthogonal directions to obtain cross-shaped element 504. Shape 614 may be cropped 616 to allow for spacing between touch elements 502 and 504, with the amount of cropping being adjustable. Using adjustable cropping 616, a slight difference in area covered by elements 502 and 504 can also be compensated for in order that both elements 502 and 504 have substantially the same area.

In some embodiments of the present invention, the size of the conductive elements is chosen so that a finger of 'normal' size (e.g. adult) will overlap more than one element in any given touch, no matter where the finger is positioned. In the exemplary embodiment described above, this is achieved by sizing the 45 degree triangle mentioned in FIG. 5 having a height approximately equal to the diameter of the finger to be sensed.

Figure 7:
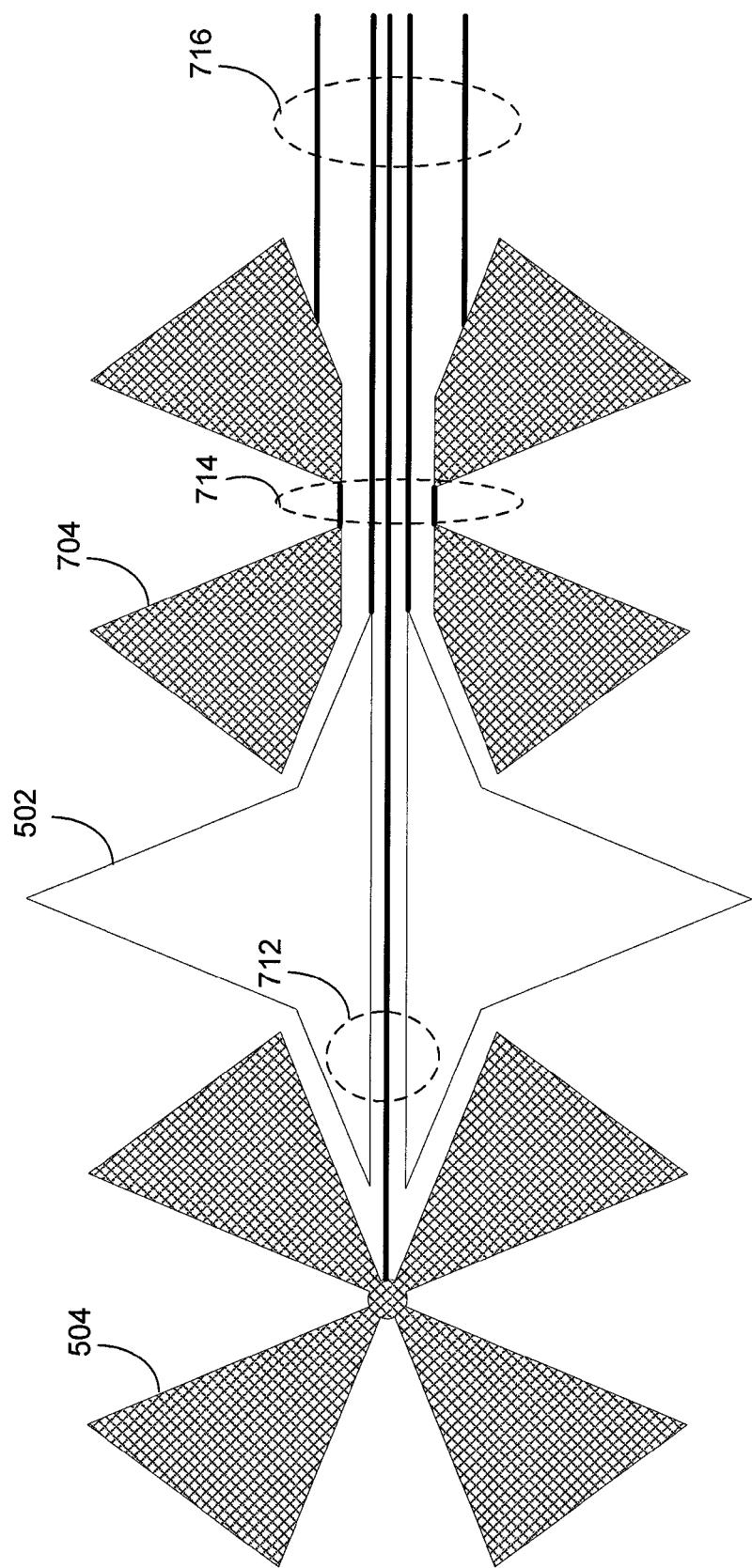
FIG. 7 illustrates how electrical connections to the conductive elements of FIG. 5 are made according to some embodiments of the present invention.

FIG. 7 illustrates how electrical connections to conductive elements 502 and 506 of FIG. 5 are made according to some embodiments of the present invention. As shown in FIG. 7, connections from internal conductive elements 502 and 506 are routed through splits in adjacent conductive elements 502 and 506, in order to allow connections to pass through the conductive elements. For example, connections 712 from cross element 504 are routed to pass through star element 502, and connections 714 from cross elements 504 and 704, and star element 502, are routed to pass through cross element 704 and combined with the traces from cross element 704 to form the combined connections 716. Connecting conductive elements to pass through other conductive elements may cause some errors in touch position determination, but the errors are one-dimensional and thus can be easily compensated. Combined connections 716 are routed to controller 102. Thus, the routing method of FIG. 7 allows for convenient and direct connection of the internal conductive elements 502 and 504 to the controller 102, thereby enhancing the accuracy of the touch sensor.

Figure 8:
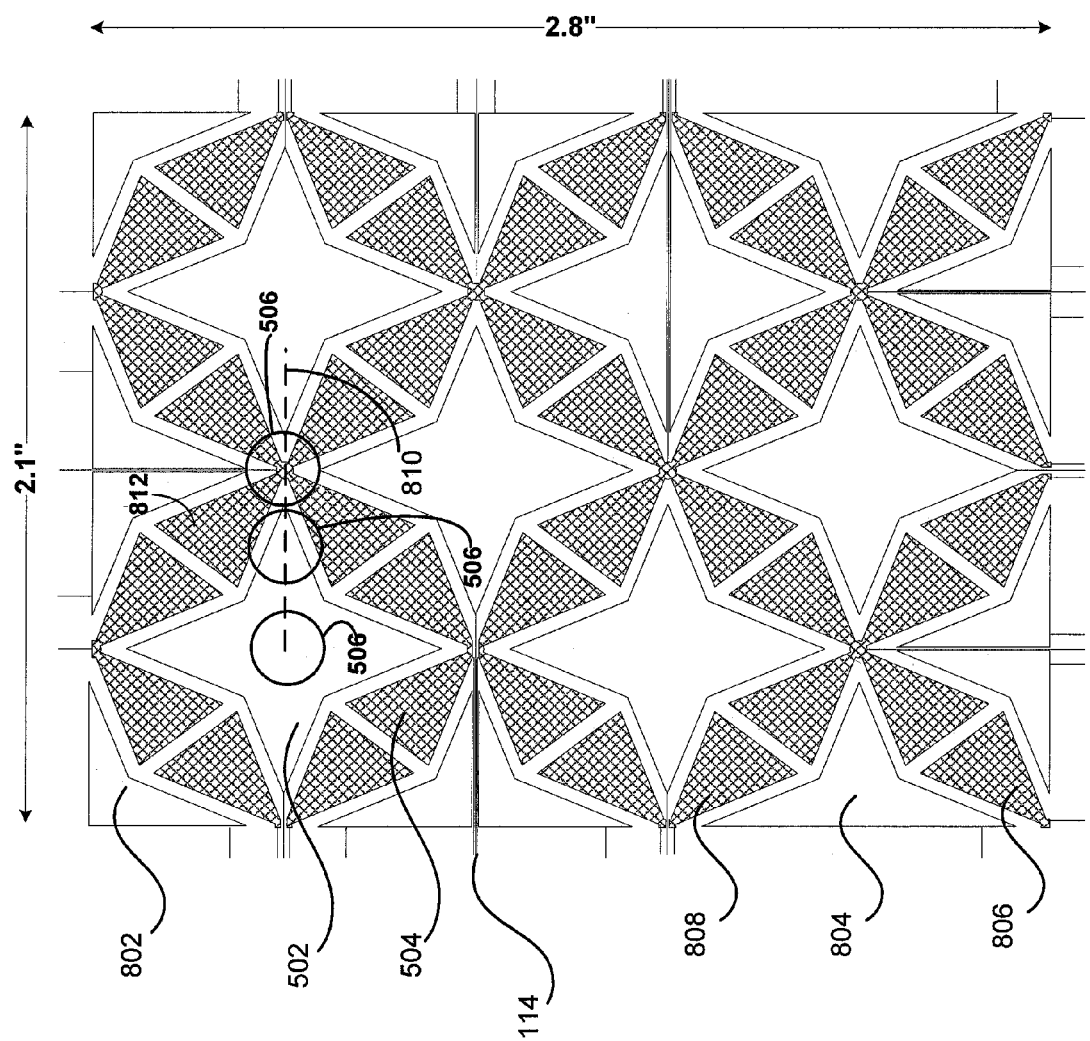
FIG. 8 illustrates an example of the physical dimensions of the conductive elements for a touch sensor according to some embodiments of the present invention.

FIG. 8 illustrates an example of the physical dimensions of the conductive elements for a touch sensor according to some embodiments of the present invention. Because star elements 502 and cross elements 504 do not form straight touch sensor edges, partial sections of cross elements 504 and star elements 502 may be used along the edges of touch sensor active area 104 to form straight edges and 90 degree corners of touch sensor active area 104. For example, conductive element 802 corresponds to the lower-right side of a star element 502, and conductive element 704 is the right side of a star element 502. For another element, conductive element 806 is the upper right side of a cross element 504, and conductive element 808 is the right-side ½ of a cross element 504. The touch sensor of FIG. 8 is an example showing how star elements 502 and cross elements 504, using entire elements or partial sections combined together, may form a square, for example a 2.1 inch×2.8 inch touch-sensor active area 104.

Figure 9:
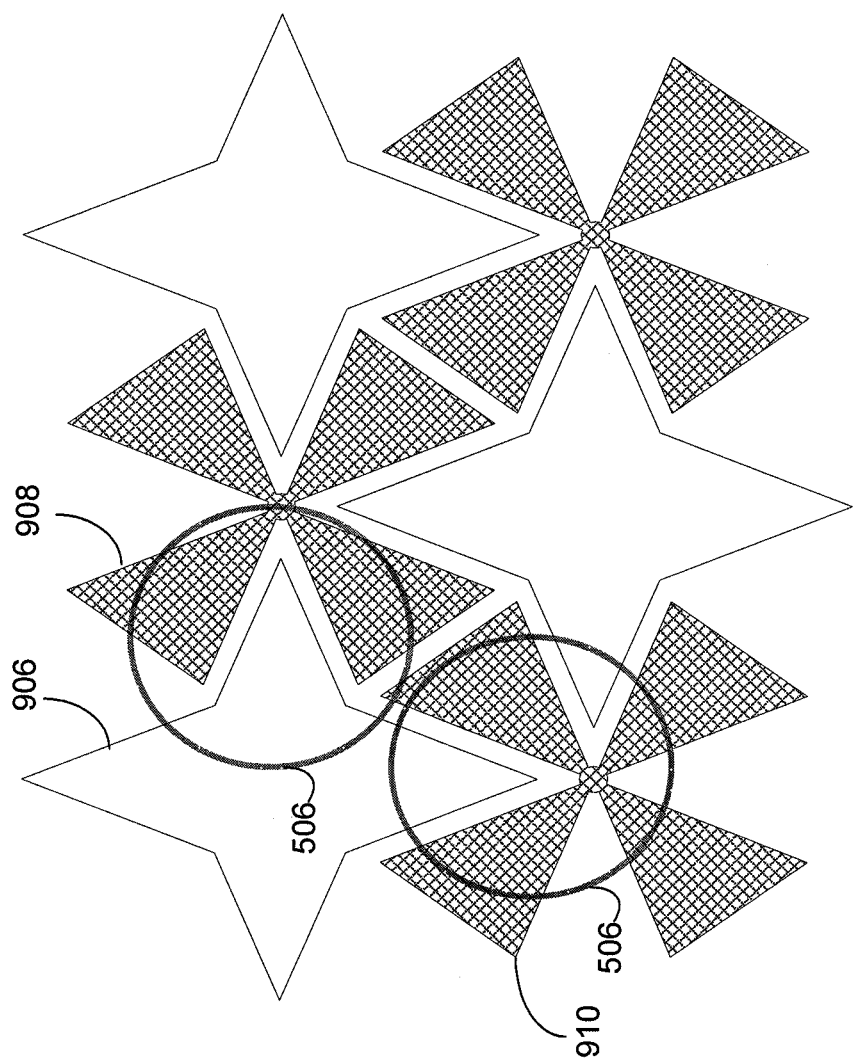
FIG. 9 illustrates the linear change in overlap area achieved by adjacent conductive elements for a touch sensor according to some embodiments of the present invention.

Elements 502 and 504 physically interact with adjacent elements in such a way that the area covered by a disc-shaped touch area 506 of, for example, 0.5" diameter, changes monotonically from overlapping a significant portion of one element 502, to overlapping a significant portion of an adjacent element 812, as touch area 506 is moved from one element 504 to the other element 812 along the line 810 between their centers. For example, in some embodiments of the present invention, the overlapping area may change linearly from 100% of one element 502, to 100% of adjacent element 812. Furthermore, this interaction may occur simultaneously in two orthogonal axes, normally 'x' and 'y'. This is also shown in FIG. 9 where movement of touch area 506 will result in gradual, monotonic (and linear) change in the area covered by touch area covered by elements 906, 908 in the 'x' direction or by elements 906 and 910 in the 'y' direction.

Figure 10:
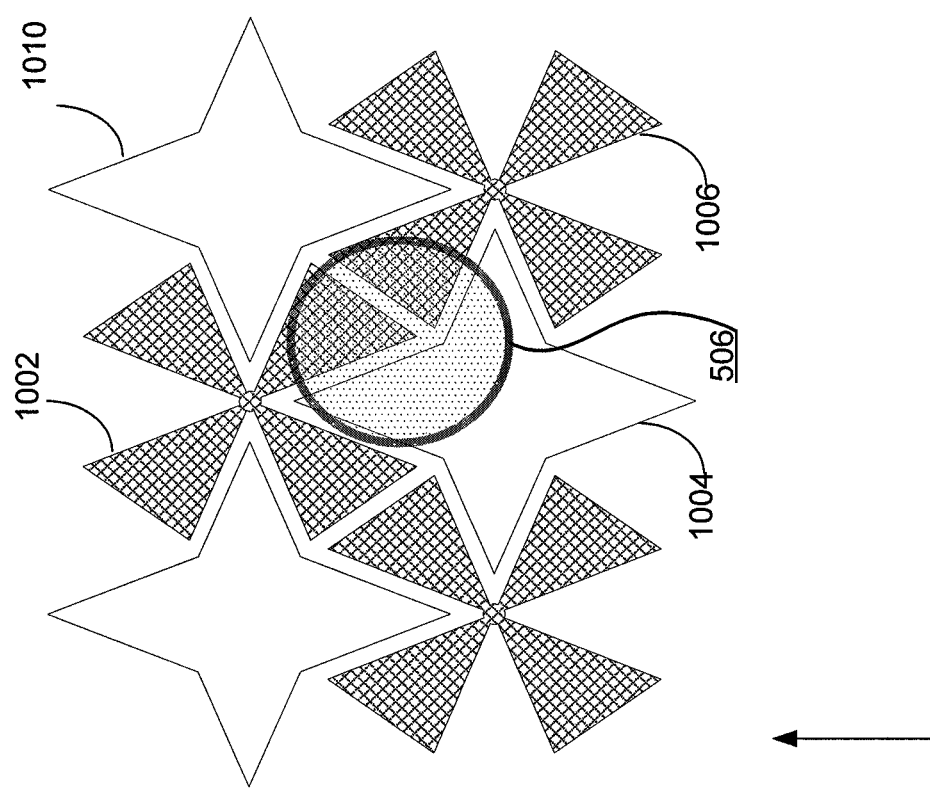
FIG. 10 illustrates how the positions of a touch are calculated using the conductive elements of FIG. 5 according to some embodiments of the present invention.

Note that the adjacent elements in the pattern may be dissimilar. That is, any one element type (for example a star element 502) may not necessarily be identical to other elements of the same type. For example, elements positioned along the edges may differ from elements positioned away from the edges. As explained above, connections 114 may be made through other elements, rather than around them. The pattern of FIG. 8 exhibits x, y symmetry, in that, if a pattern is made up of whole elements (that is, without cropped elements such as those used at the edges), the pattern may be rotated 90 degrees, with no change in operation or properties. In general, it will be noted that rotating the pattern of FIG. 8 through any angle with respect to the 'x-y' Cartesian frame, the operation and properties of the touch sensor will remain substantially unchanged FIG. 10 illustrates how the positions of a touch are calculated using the conductive elements of FIG. 5, according to some embodiments of the present invention. Table I, below, illustrates the areas and locations calculated for the specific example depicted in FIG. 9.

TABLE I

Relative Positions and Touched Areas of Active Elements

| Element | $x_i$ | $y_i$ | Area | x.area | y.area |
|---|---|---|---|---|---|
| 902 | 2 | 2 | 6 | 12 | 12 |
| 904 | 2 | 1 | 10 | 20 | 10 |
| 906 | 3 | 1 | 3 | 9 | 3 |
| TOTAL | | | 19 | 41 | 25 |
| POSITION = Total/Area = | | | | 2.16 | 1.32 |

Cross element areas are adjusted due to their smaller total area.

Calculation of Single Touch Position

The locations of the center of the conductive elements, such as cross element 1002, star element 1004, and cross elements 1006, are accurately known in relation to the other elements, in both 'x' and 'y' dimensions. The 'x' and 'y' locations for element 'i' are denoted '$x_i$' and '$y_i$', herein. These locations correspond to the coordinates of the geometric center of element 'i'. As shown in FIG. 10, touch area 506 is positioned to overlap with three conductive elements, namely elements 1002, 1004, and 1006. The relative overlap on element 'i', $a_i$, between touch area 506 and element 'i' is measured by touch controller 102 as an increase in capacitance measured for said element 'i' by touch controller 102. The 'x' and 'y' locations of touch 506 are then given by the following Equation:

$$x = \Sigma(x_i \times a_i)/\Sigma a_i \text{ and } y = \Sigma(y_i \times a_i)/\Sigma a_i \quad \text{(Equation 1)}$$

where 0<i<(number of overlapping elements).

For example, as shown in FIG. 10, the positions of elements 1002, 1004, and 1006 are (2,2), (2,1), and (3,1), respectively, in the 'x' and 'y' axes. The relative areas $a_i$ of overlap of touch area 506 with elements 1002, 1004, and 1006, as determined by controller 102 in the form of increase in capacitance, are 6, 10, and 3, respectively. Thus, as shown in FIG. 10 the position (x, y) of touch 506 can be calculated using Equation 1, as follows:

$$x = ((2 \times 6)+(2 \times 10)+(3 \times 3))/(6+10+3) = (12+20+9)/19 \approx 2.16 \quad \text{(Equation 2)}$$

$$y = ((2 \times 6)+(1 \times 10)+(1 \times 3))/(6+10+3) = (12+10+3)/19 \approx 1.32 \quad \text{(Equation 3)}$$

Thus, the position of touch 506 is approximately (2.16, 1.32). Note that the areas of cross elements 1002 and 1006 may be adjusted slightly due to their slightly smaller areas compared to star elements 1004. For the method to yield coordinates which change in a linear way, the two major shapes (the cross and the star) should be of substantially equal area. In this embodiment, the cross elements are cropped at each of the four ends to allow space between adjacent cross elements, resulting in loss of area (approximately 5% of the total area of the cross element in some embodiments). For example, such loss of area may be compensated for in the firmware algorithm of touch controller 102 by multiplying all capacitance readings from cross elements 1002 and 1006 by an adjustment factor related to this loss of area. For example, the adjustment factor may be approximately 1.05 if the loss of area is about 5%.

Figure 11:
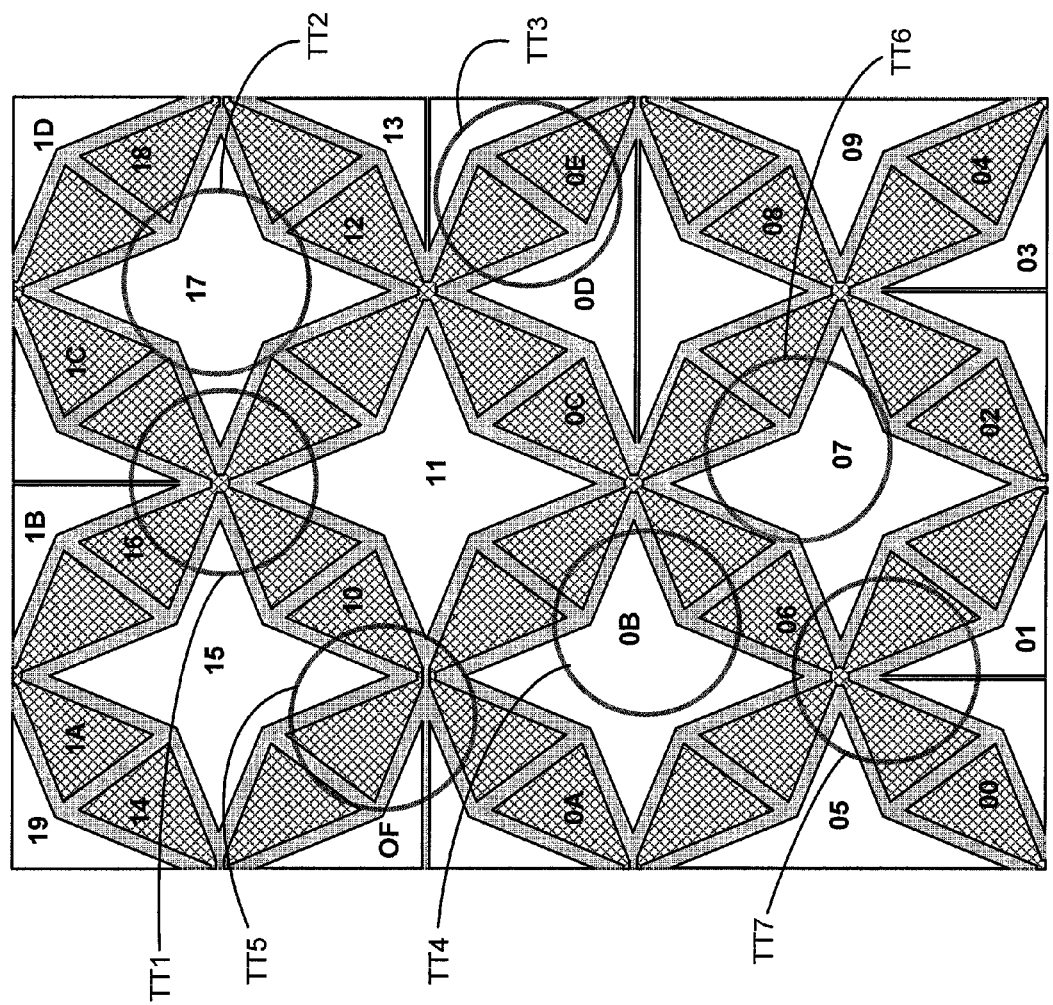
FIG. 11 illustrates a variety of touch types that can be made on the conductive elements for a touch sensor according to some embodiments of the present invention.

FIG. 11 illustrates a variety of touch types that can be made on the conductive elements for a touch sensor according to some embodiments of the present invention. Equation 1 may be insufficient to determine the location of multiple, simultaneous touches. In case of multiple simultaneous touches, an algorithm may be executed in processor 102a for determining the locations of each of the multiple touches. Algorithms of increasing complexity may be applied, all of which have some way of determining a subset of elements for each touch to use with the Equation 1 above. In explaining algorithms 1 and 2 below, the terms "major touch element" and "minor touch element" are used. A "major touch element" is the conductive element with the largest touch area for a given touch. A "minor touch element" is any other conductive element affected by that touch other than the major touch element. For example, referring back to FIG. 10, element 1004 has the largest area of overlap with touch area 506, and thus is the major touch element, and elements 1002 and 1006 are minor touch elements for touch 506. It is possible that the same element may be a major touch element for one touch but at the same time a minor touch element for another simultaneous touch.

Referring to FIG. 11, touch elements labeled 00 through 19, 0A through 0F, and 1A through 1D are shown together with multiple simultaneous touches TT1 through TT7. Element segments 00, 04, 1D and 19 are at each of the corners of the touch sensor. Element segments 01, 02, 04, 09, 0E, 13, 18, 1C, 1B, 1A, 14, 0F, 0A, and 05 form the four edges in the rectangular shape of the touch-sensor sensor of FIG. 10. Segments 00, 02, 04, 0E, 18, 1C, 1A, 14, and 0A are taken from sections of cross-shaped conductive elements. Segments 01, 03, 09, 13, 1D, 1B, 19, 0F, and 05 are taken from sections of star-shaped conductive elements. In the interior of the touch-sensor sensor area, star-shaped conductive elements 07, 0B, 0D, 11, 15, and 17 are surrounded by cross-shaped conductive elements as immediate neighbors. The term 'immediate neighbors' is understood to be the set of conductive elements comprising those whose edges are side by side. For example, in the embodiment shown in FIG. 10, star-shaped element 07 has cross-shaped elements 02, 06, 0C, and 08 as immediate neighbors; star-shaped element 0B has cross-shaped elements 0A, 06, 0C, and 10 as immediate neighbors; star-shaped element 0D has cross-shaped elements 08, 0C, 0E, and 12 as immediate neighbors; star-shaped element 11 has cross-shaped elements 10, 0C, 12, and 16 as immediate neighbors; star-shaped element 15 has cross-shaped elements 14, 10, 16, and 1A as immediate neighbors, and star-shaped element 17 has cross-shaped elements 16, 12, 18, and 1C as immediate neighbors.

Still referring to FIG. 11, for touch TT1, the major touch element is cross element 16 and the minor touch elements are star elements 15, 1B, 17, and 11. For touch TT2, the major touch element is star element 17 and the minor touch elements are all star elements 18, 12, 16, and 1C. For touch TT3, the major touch element is cross element 12 and the minor touch elements are star elements 13, 0D and cross element 0E. For touch TT4, the major touch element is star element 0B, and the minor touch elements are cross elements 10, 0C, and 06. For touch TT5, the major touch element is cross element 10, and the minor touch elements are star elements 15 and 0F. For touch TT6, the major touch element is star element 07 and the minor touch elements are cross elements 0C and 08. For touch TT7, the major touch element is cross element 06 and the minor touch elements are star elements 05, 01, 07, and 0B.

Algorithm 1

Figure 12:
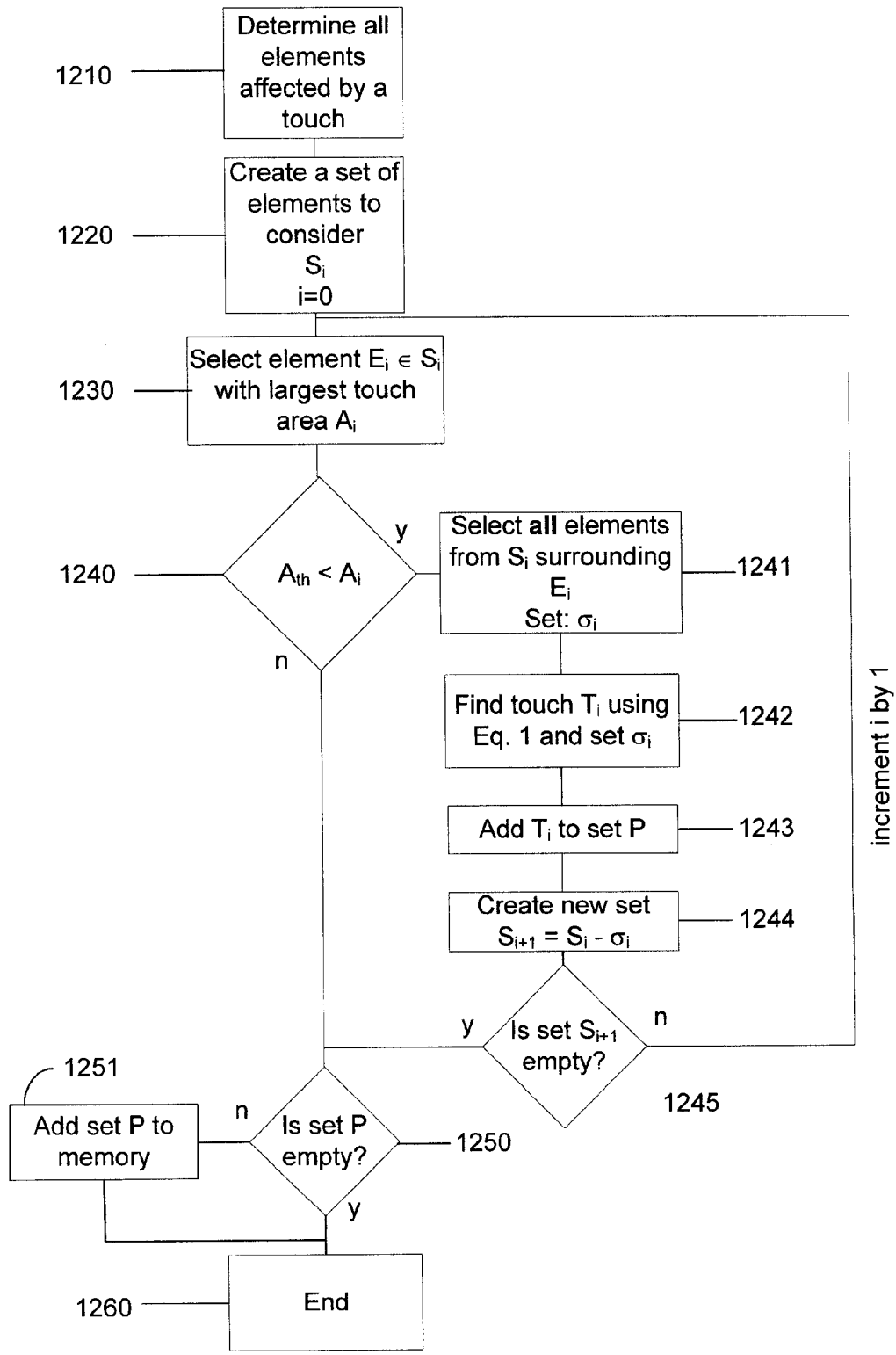
FIG. 12 is a flow chart illustrating an exemplary embodiment of an algorithm used to find the locations of multiple, simultaneous touches on a touch-sensor using a touch area threshold, $A_{th}$.

FIG. 12 shows a flow chart of an exemplary algorithm (Algorithm 1) for determining the locations of multiple simultaneous touches in some embodiments of the present invention. First, all elements that have a touch overlap measurable by touch controller 102 are identified in step 1210 and grouped in a set, $S_i$ in step 1220, where i is an iteration counter initially set to i=0. Then, the location of the element $E_i$, in set $S_i$, with the largest area of overlap, $A_i$, with a touch element, is determined in step 1230. Next, in step 1140, area $A_i$ is compared to the internal touch threshold, $A_{th}$. If that touch area, $A_i$, is above $A_{th}$, as determined by touch controller 102, the element $E_i$ and its eight surrounding elements are selected in a group $\sigma_i$, in step 1241. Set $\sigma_i$ is used in step 1242 to determine the location of the touch utilizing Equation 1. The touch location thus determined, $T_i$, is added to a set, P, of multiple touch locations in step 1243. In the exemplary embodiment depicted in FIG. 10, the surrounding elements are the four immediate neighbors (up, down, right and left) and the four diagonal neighbors (upper right, lower right, upper left, and lower left). Then, the nine elements (the major touch element and its eight neighbor elements) corresponding to that touch are marked in a database as 'used', a new set $S_{i+1}$ is created by subtracting set $\sigma_i$ from set $S_i$ in step 1244, and the process is repeated with the new set $S_{i+1}$. In step 1245, if the set $S_{i+1}$ is empty then the iteration is terminated, otherwise the iteration proceeds, incrementing counter 'i' by one. This continues until no elements are left that exceed the internal touch threshold. If touch area $A_i$ is less than or equal to $A_{th}$, the algorithm proceeds with steps 1250 and 1251. In steps 1250 and 1251, the set of touch positions, P, if not empty, is stored in touch controller memory 102b, then the algorithm terminates in step 1260. In some embodiments of the present invention, as depicted in FIG. 11, it is reasonable to detect up to 4 touches on a 3.5 inch diagonal touch sensor using Algorithm 1, but the touches must be spaced apart to some extent for accurate position determination due to the relatively low resolving ability for adjacent touches of Algorithm 1.

For example, in the example of FIG. 11, touch TT2 has the largest overlapping area with touch element 17, and thus its location is determined using Equation 1 based on major touch element 17 and its eight surrounding touch elements 1C, 18, 12, 16, 1B, 1D, 13, and 11. Then, touch TT1 has the next largest overlapping area, and thus its location is determined using Equation 1 based on major touch element 16 and its eight surrounding touch elements 15, 11, 17, 1B, 1A, 19, 12, and 1C. Then, this process is repeated for touches with the next largest overlapping areas, and so on. Note that, for example, when calculating the position of touch TT2, which is essentially centered on element 17, element 16 will be over-weighted, according to Equation 1 and Algorithm 1, since element 16 is a "major touch element" of touch TT1, centered at a different location. The reciprocal is true for touch TT1, wherein element 16 is the "major touch element," but element 17 will displace the position of TT1 towards that of TT2.

Algorithm 2

Touches caused by two fingers close together cause a touch area which is longer in one direction than it is wide in another direction. That is, the touched area is oval, rather than round, and is therefore longer in one dimension than is usually caused by a single touch. A close investigation of the touch patterns shown in FIG. 11 reveals that (i) all minor touch elements are adjacent to the major touch element, (ii) no single touch is more than two elements long in any direction, and (iii) all minor touch elements are neighbors of a major touch element, and generally all minor touch elements are neighbors of all other minor touch elements.

Referring back to FIG. 10, assuming the conductive elements are scanned from the bottom row, from right to left, conductive element 1006 is detected first to be affected by touch 506. Then, looking at the neighbors of element 1006, conductive element 1004 is determined to be the major touch element. The only other element affected by touch 506 is conductive element 1002, which is also a neighbor of element 1006. The only other element which may have been affected (but was not affected) is element 1010, which is also a neighbor of elements 1004 and 1002. This allows the definition of a basic rule, to help differentiate multiple touches from each other: All elements (1002, 1004, and 1006) affected by a touch (506) are neighbors of each other. This rule above holds well, and in some embodiments of the present invention is the basis of Algorithm 2, illustrated in FIG. 13.

Figure 13:
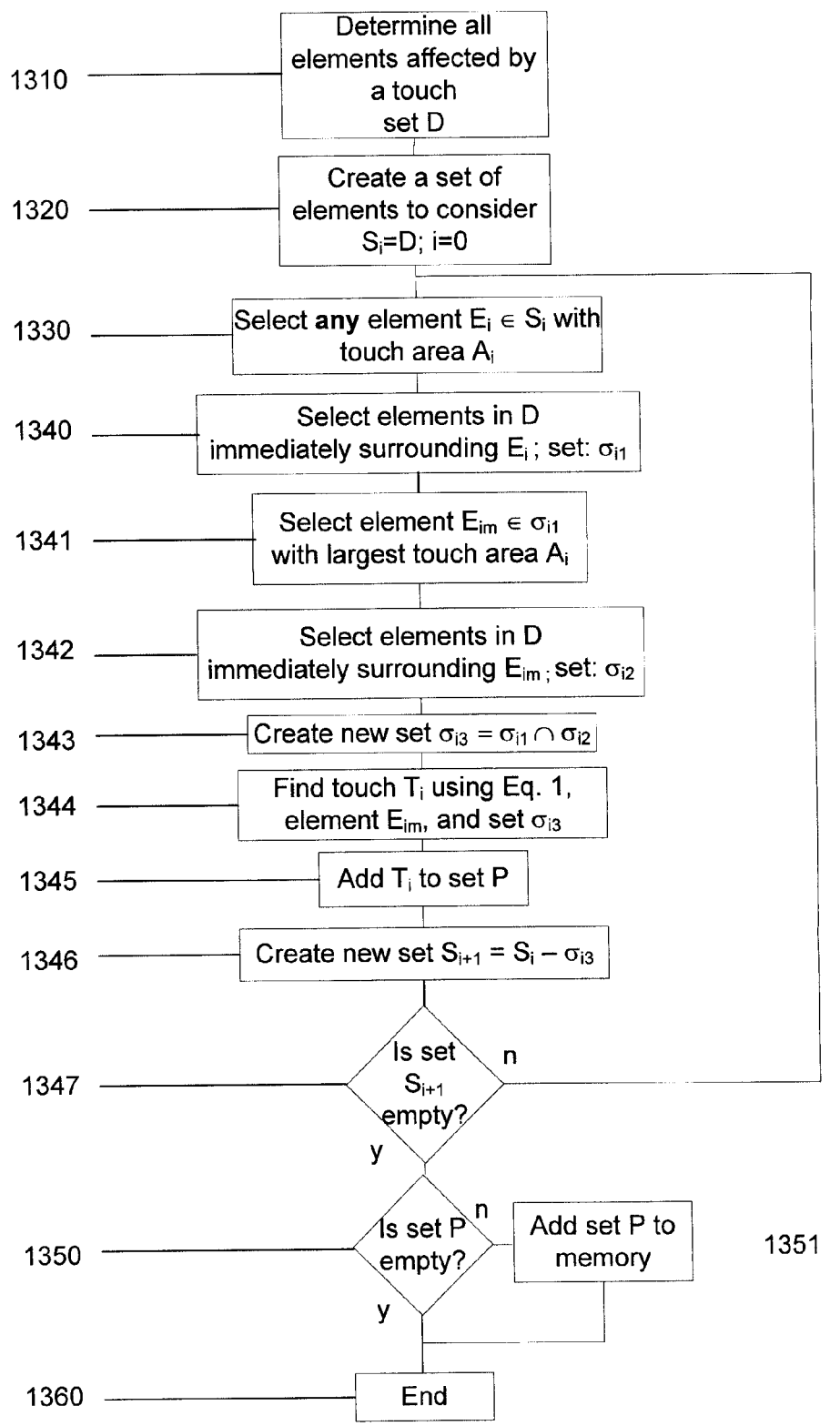
FIG. 13 is a flow chart illustrating an exemplary embodiment of an algorithm used to find the locations of multiple, simultaneous touches on a touch sensor.

FIG. 13 shows a flow chart of one exemplary algorithm (Algorithm 2) for determining the locations of multiple simultaneous touches in some embodiments of the present invention. In Algorithm 2, touch controller 102 scans the conductive elements to identify all of the conductive elements that are touched and to create a set, D, with these elements in step 1310. With an iteration counter, 'i', set to i=0, a set of conductive elements, $S_i$, is selected: $S_i$=D, in the next step, step 1320. Then, any conductive element, $E_i$, within set $S_i$ (not necessarily the element which has the largest touch area) is selected in step 1330; element $E_i$ may or may not be the first found minor element. Then, in step 1340 the immediate neighbors of belonging to set D are selected to create a set, set $\sigma_{i1}$.

Next, in step 1341, the set $\sigma_{i1}$ is scanned to find the conductive element with the largest area of overlap, which is the local major touch element, $E_{im}$. Next, in step 1342, touch controller 102 scans set D, to look for immediate neighbors of element $E_{im}$ and build a new set, $\sigma_{i2}$. Then, in step 1343, controller 102 looks for common neighbors between the neighbors of element $E_i$ and the neighbors of element $E_{im}$, and uses just these common neighbor elements, and local major element $E_{im}$, to determine the touch position. In other words, the touch controller finds a new set, $\sigma_{i3}$, which is the intersection of sets $\sigma_{i1}$ and $\sigma_{i2}$, that is $\sigma_{i3}=\sigma_{i1} \cap \sigma_{i2}$.

The new touch position, $T_i$, is found by using Equation 1 with the set of positions comprising set $\sigma_{i3}$, and element $E_{im}$, in step 1344. The used elements are then marked as 'partially used.' In some embodiments of the present invention, like the one depicted in FIG. 11, the number of elements comprising set $\sigma_{i3}$ may be typically six. According to Algorithm 2, 'partially used' elements cannot be used to detect a new touch, but can be used in calculating the position of a touch identified by another element in order to prevent locating the same touch multiple times. In other words, after finding the new touch position, $T_i$, and adding it to set P (step 1345), some embodiments of the present algorithm create a new set $S_{i+1}$ by subtracting set $\sigma_{i3}$ from set $S_i$; that is $S_{i+1}=S_i-\sigma_{i3}$, as illustrated in step 1346. In step 1347, it is evaluated whether or not set $S_{i+1}$ is empty. If it is not, then steps 1330-1346 are repeated for the new set $S_{i+1}$, until the new set, $S_{i+1}$ is an empty set. Note also that, in general, for i≠0, the set $S_i$ is a subset of D, with fewer elements. Once all elements in set D have been exhausted and set $S_{i+1}$ is empty, then set P, if not empty, is stored in memory 102b (steps 1350 and 1351), before termination of the algorithm step 1360.

Algorithm 2 allows for significantly closer touches to be distinguished, but due to the possibility of shared minor touch elements, their location determination may not be as accurate as desired. The positions of other touches may be determined by repeating the above process in Algorithm 2.

For example, referring to FIG. 11 to explain Algorithm 2, the touch sensor is scanned to identify any element which is touched. For example, element 08 is identified as touched by touch TT6. The immediate neighbor elements OD, 07, 09, and 03 of the first found minor touch element 08, are scanned to identify local major element 07. The neighbor set S1 of the neighbors of the first found minor element 08 is: S1={07, OC, OD, OE, 09, 04, 03, 02}. The neighbor set S2 of the neighbors of local major element 07 is: S2={06, OB, OC, OD, 08, 03, 02, 01}. The common set S3 of the common neighbors between the sets 51 and S2 is: S3=S1∩S2={OC, OD, 08, 03, 02}. This common set S3 of common neighbors, and local major element 07, are marked as "partially used," so that they are not used to detect a new touch itself. Finally, the position of the touch TT6 is determined using Equation 1, based on the common conductive elements S3={OC, OD, 08, 03, 02} and local major element 07. The positions of other touches may be determined by repeating the above process in Algorithm 2.

As another example of the use of algorithm 2, referring to FIG. 11 and touch elements TT2 and TT1, assume that during the $i^{th}$ iteration, the algorithm selects element 18; i.e. $E_i=18$. Then the set $\sigma_{i1}$ will be, $\sigma_{i1}=\{12, 17, 1C\}$; in the next step, the algorithm will select element $17\epsilon\sigma_{i1}$ as the local major element in $\sigma_{i1}$; i.e $E_{im}=17$. Construction of set $\sigma_{i2}$ follows, with the result, $\sigma_{i2}=\{12, 18, 1C, 16, 11\}$. Next, set $\sigma_{i3}$ is found: $\sigma_{i3}=\sigma_{i1}\cap\sigma_{i2}=\{12, 1C\}$. The location of touch TT2 is found using $\sigma_{i3}$ (={12, 1C}) and element 17, according to their touch weight. It will be noted that TT2 will be located accurately, very close to the center of element 17.

Proceeding with the example above, elements in $\sigma_{i3}$ (={12, 1C}) and element 17 are marked as 'partially used,' iteration counter is increased to i+1, and then algorithm 2 selects another element, say element 11; i.e. $E_{i+1}=11$. The set $\sigma_{(i+1)1}$ is construed: $\sigma_{(i+1)1}=\{12, 16, 10, 0C\}$; then, element 16 is selected as the local major element in $\sigma_{(i+1)1}$; i.e. $E_{(i+1)m}=16$, and set $\sigma_{(i+1)2}$ is construed as: $\sigma_{(i+1)2}=\{1B, 17, 11, 10, 15\}$. Next, set $\sigma_{(i+1)3}=\{10\}$ is construed, and the position of TT1 is determined by the touch weight of elements in $\sigma_{(i+1)3}$ (={10}), and element 16. It will be noted that the resulting position of TT1 will be along the line joining TT5 and TT1, but closer to TT1. The accuracy of the calculated location of TT1 is nevertheless better in this case than ½ the overall length of the cross-shaped elements 504 of the embodiment illustrated in FIG. 5.

According to the alternating, complementary patterns of the conductive elements of the touch sensor of some embodiments of the present invention, a single layer of conductive material may be used to detect multiple simultaneous touches with the area affected by a touch linearly changing with the change of touch position in two orthogonal directions. The touch position may be determined accurately with such patterns. Although patterns including alternating star conductive elements and cross conductive elements are used herein as the touch element pattern, other alternating, complementary shapes may be used, consistent with the present invention. Although a single layer of conductive material is used herein with the embodiments of the touch sensors, the shapes may be on two or more conductive layers, may be connected singly (as described herein), or may be connected in a matrix organization. The matrix organization connects groups of touch sensor elements together.

Upon reading this disclosure, those of skill in the art will appreciate still additional alternative designs or shapes for the conductive touch elements for touch sensors. Thus, while particular embodiments and applications of the present invention have been illustrated and described, it is to be understood that the invention is not limited to the precise construction and components disclosed herein and that various modifications, changes and variations which will be apparent to those skilled in the art may be made in the arrangement, operation and details of the method and apparatus of the present invention disclosed herein without departing from the spirit and scope of the invention.

What is claimed is:

1. A method of determining touch locations on a touch sensor having conductive elements connected to a touch controller, the touch controller configured to measure changes in capacitance of each of the conductive elements, the method comprising:
   (a) selecting a group of conductive elements overlapped by a touch based on the measurements of the touch controller;
   (b) determining a weighted average of coordinates of centers of each of the conductive elements;
   (c) associating a touch position with the determined weighted average of the selected group of overlapping conductive elements;
   (d) selecting a first conductive element in the group of conductive elements overlapped by a touch that has a largest overlapping area;
   (e) selecting a threshold area for sensitivity;
   (f) determining if the largest overlapping area is greater than the preselected threshold;
   (g) selecting a first group of elements surrounding the selected first conductive element;
   (h) using coordinates of centers of each of the conductive elements in the first group of conducting elements to determine a weighted average of said coordinates;
   (i) associating a touch position with the determined weighted average of the first group of conductive elements;
   (j) marking the first conductive element in said selected first group as 'used' and removing the first conductive element from further consideration in the measurements; and
   (k) repeating steps (d) through (j) with remaining conductive elements in the group of overlapping elements.

2. The method of claim 1, wherein determining the weighted average comprises:
   measuring a change in capacitance for each of the conductive elements in the first group of conductive elements, relative to the total surface area of all the conductive elements in the selected first group of conductive elements.

3. The method of claim 1, further comprising:
   finding the touch positions of multiple, simultaneous touches on the touch sensor.

4. A method of determining touch locations on a touch sensor having conductive elements connected to a touch controller, the touch controller configured to measure changes in capacitance of each of the conductive elements, the method comprising:
   (a) selecting a group of conductive elements overlapped by a touch based on the measurements of the touch controller;
   (b) determining a weighted average using coordinates of centers of each of the conductive elements;
   (c) associating a touch position with the determined weighted average of the selected group of overlapping conductive elements;
   (d) selecting a first conductive element in the group of conductive elements overlapped by a touch;
   (e) selecting a first group of immediate neighboring elements of the first conductive element;
   (f) selecting a first major touch element from the selected first group of conducting elements overlapped by a touch, which has the largest overlap area in the selected first group;
   (g) selecting a second group of immediate neighboring elements of the first major touch element;
   (h) selecting a third group comprising the conductive elements that are common to the first group and the second group;

(i) determining a weighted average of coordinates of centers of each of the conductive elements in the third group of conducting elements;
(j) assigning a touch position with the determined weighted average of the selected third group of conductive elements;
(k) marking the conductive elements in the third group as 'partially used' so that they are not used as a first conductive element in further steps; and
repeating steps (d) through (k) with the remaining conductive elements in the group of overlapping elements until no elements can be selected as first conductive elements.

5. The method of claim 4, wherein determining the weighted average comprises:
measuring a change in capacitance for each of the conductive elements in the third group of conductive elements, relative to the total surface area of all the conductive elements in the third group of conductive elements.

6. The method of claim 4, further comprising:
finding the touch positions of multiple, simultaneous touches on the touch sensor.

* * * * *